(12) United States Patent
Kumar et al.

(10) Patent No.: US 9,930,678 B2
(45) Date of Patent: Mar. 27, 2018

(54) MULTIPLEXING UES WITH DIFFERENT TDD CONFIGURATIONS AND SOME TECHNIQUES TO MITIGATE UE-TO-UE AND BASE STATION-TO-BASE STATION INTERFERENCE

(71) Applicant: QUALCOMM Incorporated, San Diego, CA (US)

(72) Inventors: Raj K. Kumar, Bangalore (IN); Kapil Bhattad, Bangalore (IN); Dhananjay A. Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/945,761

(22) Filed: Jul. 18, 2013

(65) Prior Publication Data

US 2014/0023004 A1 Jan. 23, 2014

Related U.S. Application Data

(60) Provisional application No. 61/673,699, filed on Jul. 19, 2012.

(51) Int. Cl.
| | |
|---|---|
| *H04W 4/00* | (2009.01) |
| *H04W 72/08* | (2009.01) |
| *H04L 1/00* | (2006.01) |
| *H04L 1/18* | (2006.01) |

(52) U.S. Cl.
CPC ......... *H04W 72/082* (2013.01); *H04L 1/0007* (2013.01); *H04L 1/0026* (2013.01); *H04L 1/0027* (2013.01); *H04L 1/1887* (2013.01); *H04L 1/1893* (2013.01); *H04L 1/1854* (2013.01)

(58) Field of Classification Search
USPC ................................................. 370/310–350
See application file for complete search history.

(56) References Cited

U.S. PATENT DOCUMENTS

| | | | |
|---|---|---|---|
| 6,996,078 B2 | 2/2006 | Pan et al. | |
| 7,826,438 B1 | 11/2010 | Salhotra et al. | |
| 8,559,342 B2* | 10/2013 | Kim ................ | H04W 52/0216 370/278 |
| 2005/0266846 A1* | 12/2005 | Kim ............................. | 455/436 |
| 2009/0103440 A1 | 4/2009 | Wang et al. | |

(Continued)

FOREIGN PATENT DOCUMENTS

| | | |
|---|---|---|
| EP | 1229671 A2 | 8/2002 |
| EP | 2040503 A1 | 3/2009 |

(Continued)

OTHER PUBLICATIONS

U.S. Appl. No. 61/262,156; Seung Hee Han.*

(Continued)

*Primary Examiner* — Kwang B Yao
*Assistant Examiner* — Juvena Loo
(74) *Attorney, Agent, or Firm* — Seyfarth Shaw LLP

(57) ABSTRACT

A method of wireless communication includes determining a set of subframes with a reduced likelihood of being received as uplink transmissions of a first user equipment (UE). The method also includes scheduling uplink transmissions of the first UE by scheduling uplink control information (UCI) on subframes other than the determined set of subframes.

30 Claims, 12 Drawing Sheets

(56) References Cited

U.S. PATENT DOCUMENTS

| | | | |
|---|---|---|---|
| 2009/0201871 A1* | 8/2009 | Sambhwani | H04W 72/0406 370/329 |
| 2009/0268685 A1 | 10/2009 | Chen et al. | |
| 2010/0074204 A1 | 3/2010 | Meylan | |
| 2010/0128686 A1 | 5/2010 | Nishio et al. | |
| 2010/0195583 A1* | 8/2010 | Nory et al. | 370/329 |
| 2010/0220597 A1 | 9/2010 | Ji et al. | |
| 2010/0246456 A1 | 9/2010 | Suo et al. | |
| 2010/0255854 A1* | 10/2010 | Lee | H04W 72/082 455/450 |
| 2010/0309867 A1* | 12/2010 | Palanki | H04L 5/0053 370/329 |
| 2011/0032852 A1 | 2/2011 | Xin | |
| 2011/0117949 A1 | 5/2011 | Joko | |
| 2011/0170499 A1 | 7/2011 | Nayeb Nazar et al. | |
| 2011/0176435 A1 | 7/2011 | Khandekar et al. | |
| 2011/0176461 A1* | 7/2011 | Astely | H04B 7/2656 370/280 |
| 2011/0211503 A1 | 9/2011 | Che et al. | |
| 2011/0250913 A1 | 10/2011 | Vajapeyam et al. | |
| 2011/0310830 A1 | 12/2011 | Wu et al. | |
| 2012/0002597 A1 | 1/2012 | Yang et al. | |
| 2012/0082070 A1* | 4/2012 | Hart | H04J 11/0023 370/280 |
| 2012/0195224 A1 | 8/2012 | Kazmi et al. | |
| 2012/0207125 A1 | 8/2012 | Takamatsu | |
| 2012/0230273 A1* | 9/2012 | He | H04L 1/1887 370/329 |
| 2012/0275409 A1* | 11/2012 | Han | H04L 1/0007 370/329 |
| 2013/0010711 A1* | 1/2013 | Larsson | H04W 56/0005 370/329 |
| 2013/0083740 A1* | 4/2013 | Eriksson | H04L 1/1861 370/329 |
| 2013/0084907 A1 | 4/2013 | Shen et al. | |
| 2013/0121189 A1 | 5/2013 | Bhattad et al. | |
| 2013/0242799 A1* | 9/2013 | Yin | H04L 1/1861 370/254 |
| 2013/0242813 A1* | 9/2013 | Wang | H04L 1/1887 370/280 |
| 2013/0242814 A1* | 9/2013 | Wang | H04L 1/1861 370/280 |
| 2013/0242815 A1* | 9/2013 | Wang | H04L 1/1854 370/280 |
| 2013/0343241 A1* | 12/2013 | Niu | H04B 15/00 370/280 |
| 2014/0029489 A1* | 1/2014 | Han | H04L 1/1812 370/280 |
| 2014/0198766 A1* | 7/2014 | Siomina | H04W 72/082 370/330 |
| 2014/0269457 A1* | 9/2014 | Folke et al. | 370/280 |
| 2015/0003272 A1* | 1/2015 | Hu | H04L 5/14 370/252 |
| 2015/0078220 A1* | 3/2015 | Hu | H04W 24/08 370/280 |

FOREIGN PATENT DOCUMENTS

| | | |
|---|---|---|
| EP | 2056528 A1 | 5/2009 |
| JP | 2002232940 A | 8/2002 |
| WO | 02103943 A1 | 12/2002 |
| WO | 03017696 A1 | 2/2003 |
| WO | 2009045011 A1 | 4/2009 |
| WO | 2009120888 A2 | 10/2009 |
| WO | 2010022070 A1 | 2/2010 |
| WO | 2010138768 A1 | 12/2010 |
| WO | 2011023057 A1 | 3/2011 |
| WO | 2011162656 A1 | 12/2011 |
| WO | 2012044240 A1 | 4/2012 |

OTHER PUBLICATIONS

Huawei: "Resource allocation for uplink ACK/NACK multiplexing", 3GPP Draft; R1-104282, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010, Aug. 17, 2010 (Aug. 17, 2010), XP050449651, [retrieved on Aug. 17, 2010].

International Search Report and Written Opinion—PCT/US2013/051287—ISA/EPO—dated Jan. 23, 2014.

Partial International Search Report—PCT/US2013/051287—ISA/EPO—dated Oct. 7, 2013.

Samsung: "PUCCH HARQ-ACK Resource Mapping for DL CA", 3GPP Draft; R1-104582 PUCCH A N Resource Indexing, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010, Aug. 17, 2010 (Aug. 17, 2010), XP050449877.

Ericsson et al., "UL/DL interference scenarios in LTE TDD", 3GPP Draft; R1-112084, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 22, 2011, Aug. 16, 2011 (Aug. 16, 2011), XP050537272, [retrieved on Aug. 16, 2011].

Lee, H., et al., "Combination of Dynamic-TDD and Static-TDD Based on Adaptive Power Control", IEEE 68th Vehicular Technology Conference (VTC), Sep. 21, 2008, IEEE, Piscataway, NJ, USA, pp. 1-5, XP031352570, ISBN: 978-1-4244-1721-6, the whole document.

ZTE: "Different deployment scenarios for co-existence study for TDD-LTE", 3GPP Draft; R4-114051, 3rd Generation Partnership Project (3GPP), Mobile Competence Centre; 650, Route Des Lucioles; F-06921 Sophia-Antipolis Cedex; France, vol. RAN WG4, No. Athens, Greece; Aug. 22, 2011, Aug. 16, 2011 (Aug. 16, 2011), XP050543102, [retrieved on Aug. 16, 2011].

Chang P., et al., "Interference Analysis and Performance Evaluation for LTE TDD System," International Conference on Advanced Computer Control (ICACC), 2010, pp. 410-414.

European Search Report—EP16155159—Search Authority—The Hague—dated Jun. 21, 2016.

European Search Report—EP16155176—Search Authority—The Hague—dated Jun. 22, 2016.

European Search Report—EP16155177—Search Authority—The Hague—dated Jun. 13, 2016.

European Search Report—EP16155164—Search Authority—The Hague—dated Jun. 3, 2016.

European Search Report—EP16155161—Search Authority—The Hague—dated May 30, 2016.

* cited by examiner

MULTIPLEXING UES WITH DIFFERENT TDD CONFIGURATIONS AND SOME TECHNIQUES TO MITIGATE UE-TO-UE AND BASE STATION-TO-BASE STATION INTERFERENCE

CROSS-REFERENCE TO RELATED APPLICATIONS

The present application claims the benefit of U.S. Provisional Patent Application No. 61/673,699 filed on Jul. 19, 2012, the disclosure of which is expressly incorporated by reference herein in its entirety. The present application is related to co-pending U.S. application Ser. No. 13/672,458 filed on Nov. 8, 2012, assigned to the assignee hereof, and expressly incorporated by reference herein in its entirety.

BACKGROUND

Field

Aspects of the present disclosure relate generally to wireless communication systems, and more particularly to multiplexing user equipment (UE) with different time division duplex (TDD) configurations and mitigating UE-to-UE and base station-to-base station interference.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies are adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP).

LTE technology is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. As the demand for mobile broadband access continues to increase, however, there exists a need for further improvements in LTE technology. Preferably, these improvements should be applicable to other multi-access technologies and the telecommunication standards that employ these technologies. Research and development continue to advance LTE technology not only to meet the growing demand for mobile broadband access, but to advance and enhance the user experience with mobile communications.

SUMMARY

In one aspect, a method of wireless communication is disclosed. The method includes determining a set of subframes with a reduced likelihood of being received as uplink transmissions of a first user equipment (UE). The method also includes scheduling uplink transmissions of the first UE by scheduling uplink control information (UCI) on subframes other than the determined set of subframes.

In another aspect, a method of wireless communication is disclosed. The method includes determining when an uplink acknowledgement/negative acknowledgement (ACK/NACK) message corresponding to a downlink data transmission of a first user equipment (UE) experiences interference from downlink communications of a base station. The method also includes either transmitting reduced size downlink retransmissions to trigger another uplink ACK/NACK message corresponding to the downlink data transmission, or setting a later hybrid automatic repeat request (HARQ) termination for downlink subframes associated with an uplink communication.

In another aspect, a method of wireless communication is disclosed. The method includes determining when uplink communications of a first user equipment (UE) operating with a first time division duplex (TDD) configuration could collide with uplink communications of a second UE operating with a second TDD configuration that is different from the first TDD configuration. The method also includes scheduling or mapping uplink resources to avoid interference.

In another aspect, a method of wireless communication is disclosed. The method includes determining when a downlink acknowledgement (ACK) resource to a first user equipment (UE) in accordance with a first time division duplex (TDD) configuration could interfere with a downlink ACK resource to a second UE in accordance with a second TDD configuration that is different from the first TDD configuration. The method also includes scheduling uplink data resources or defining a new mapping for ACK/NACK resources of at least one UE to avoid the interference.

In another aspect, a method of wireless communication is disclosed. The method includes advertising a physical random access channel (PRACH) configuration that has PRACH resources comprising only subframes that are uplink subframes for all time division duplex (TDD) configurations among which a base station switches or a subset of all the TDD configurations among which a base station switches.

In another aspect, a method of wireless communication is disclosed. The method includes modifying behavior of non-legacy UEs to only use physical random access channel (PRACH) resources that fall on subframes that are uplink for all the TDD configurations or a subset of all the TDD configurations among which a base station switches.

Another aspect discloses a wireless communication apparatus having a memory and at least one processor coupled to the memory. The processor(s) is configured to determine a set of subframes with a reduced likelihood of being received as uplink transmissions of a first user equipment (UE). The processor(s) is also configured to schedule uplink transmissions of the first UE by scheduling uplink control information (UCI) on subframes other than the determined set of subframes.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of determining a set of subframes with a reduced likelihood of being received as uplink transmissions of a first user equipment (UE). The program code also causes the processor(s) to schedule uplink transmissions of the first UE by scheduling uplink control information (UCI) on subframes other than the determined set of subframes.

Another aspect discloses an apparatus for wireless communication including means for determining a set of subframes with a reduced likelihood of being received as uplink transmissions of a first user equipment (UE). The apparatus also includes means for scheduling uplink transmissions of the first UE by scheduling uplink control information (UCI) on subframes other than the determined set of subframes.

Another aspect discloses a wireless communication apparatus having a memory and at least one processor coupled to the memory. The processor(s) is configured to determine when an uplink acknowledgement/negative acknowledgement (ACK/NACK) message corresponding to a downlink data transmission of a first user equipment (UE) experiences interference from downlink communications of a base station. The processor(s) is also configured to either transmit reduced size downlink retransmissions to trigger another uplink ACK/NACK message corresponding to the downlink data transmission, or to set a later hybrid automatic repeat request (HARQ) termination for downlink subframes associated with an uplink communication.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of determining when an uplink acknowledgement/negative acknowledgement (ACK/NACK) message corresponding to a downlink data transmission of a first user equipment (UE) experience interference from downlink communications of a base station. The program code also causes the processor(s) to either transmit reduced size downlink retransmissions to trigger another uplink ACK/NACK message corresponding to the downlink data transmission, or to set a later hybrid automatic repeat request (HARQ) termination for downlink subframes associated with an uplink communication.

Another aspect discloses an apparatus for wireless communication including means for determining when an uplink acknowledgement/negative acknowledgement (ACK/NACK) message corresponding to a downlink data transmission of a first user equipment (UE) experiences interference from downlink communications of a base station. The method also includes either means for transmitting reduced size downlink retransmissions to trigger another uplink ACK/NACK message corresponding to the downlink data transmission, or means for setting a later hybrid automatic repeat request (HARQ) termination for downlink subframes associated with an uplink communication.

Another aspect discloses a wireless communication apparatus having a memory and at least one processor coupled to the memory. The processor(s) is configured to determine when uplink communications of a first user equipment (UE) operating with a first time division duplex (TDD) configuration could collide with uplink communications of a second UE operating with a second TDD configuration that is different from the first TDD configuration. The processor(s) is also configured to schedule or to map uplink resources to avoid such interference.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of determining when uplink communications of a first user equipment (UE) operating with a first time division duplex (TDD) configuration could collide with uplink communications of a second UE operating with a second TDD configuration that is different from the first TDD configuration. The program code also causes the processor(s) to schedule or to map uplink resources to avoid such interference.

Another aspect discloses an apparatus for wireless communication including means for determining when uplink communications of a first user equipment (UE) operating with a first time division duplex (TDD) configuration could collide with uplink communications of a second UE operating with a second TDD configuration that is different from the first TDD configuration. The apparatus also includes means for scheduling or mapping uplink resources to avoid such interference.

Another aspect discloses a wireless communication apparatus having a memory and at least one processor coupled to the memory. The processor(s) is configured to determine when a downlink acknowledgement (ACK) resource to a first user equipment (UE) in accordance with a first time division duplex (TDD) configuration could collide with a downlink ACK resource to a second UE in accordance with a second TDD configuration that is different from the first TDD configuration. The processor(s) is also configured to schedule uplink data resources or define a new mapping for ACK/NACK resources of at least one UE to avoid the interference.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of determining when a downlink acknowledgement (ACK) resource to a first user equipment (UE) in accordance with a first time division duplex (TDD) configuration could collide with a downlink ACK resource to a second UE in accordance with a second TDD configuration that is different from the first TDD configuration. The program code also causes the processor(s) to schedule uplink data resources or to define a new mapping for ACK/NACK resources of at least one UE to avoid the interference.

Another aspect discloses an apparatus for wireless communication including means for determining when a downlink acknowledgement (ACK) resource to a first user equipment (UE) in accordance with a first time division duplex (TDD) configuration could collide with a downlink ACK resource to a second UE in accordance with a second TDD configuration that is different from the first TDD configuration. The apparatus also includes means for scheduling uplink data resources or defining a new mapping for ACK/NACK resources of at least one UE to avoid the interference.

Another aspect discloses a wireless communication apparatus having a memory and at least one processor coupled to the memory. The processor(s) is configured to advertise a physical random access channel (PRACH) configuration that has PRACH resources comprising only subframes that are uplink subframes for all time division duplex (TDD)

configurations among which a base station switches or a subset of all the TDD configurations among which the base station switches.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of advertising a physical random access channel (PRACH) configuration that has PRACH resources comprising only subframes that are uplink subframes for all time division duplex (TDD) configurations among which a base station switches or a subset of all the TDD configurations among which the base station switches.

Another aspect discloses an apparatus for wireless communication including means for determining a physical random access channel (PRACH) configuration that has PRACH resources comprising only subframes that are uplink subframes for all time division duplex (TDD) configurations among which a base station switches or a subset of all the TDD configurations among which the base station switches. The apparatus also includes means for advertising the PRACH configuration.

Another aspect discloses a wireless communication apparatus having a memory and at least one processor coupled to the memory. The processor(s) is configured to modify behavior of non-legacy UEs to only use physical random access channel (PRACH) resources that fall on the subframes that are uplink for all the TDD configurations or the subset of all the TDD configurations among which a base station switches.

In another aspect, a computer program product for wireless communications in a wireless network having a non-transitory computer-readable medium is disclosed. The computer readable medium has non-transitory program code recorded thereon which, when executed by processor(s), causes the processor(s) to perform operations of modifying behavior of non-legacy UEs to only use physical random access channel (PRACH) resources that fall on subframes that are uplink for all the TDD configurations or the subset of all the TDD configurations among which a base station switches.

Another aspect discloses an apparatus for wireless communication including means for determining physical random access channel (PRACH) resources falling on subframes that are uplink subframes for all time division duplex (TDD) configurations among which a base station switches or a subset of all the TDD configurations among which the base station switches. The apparatus also includes means for modifying behavior of non-legacy UEs to only use the PRACH resources that fall on the subframes that are uplink for all the TDD configurations or the subset of all the TDD configurations among which the base station switches.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
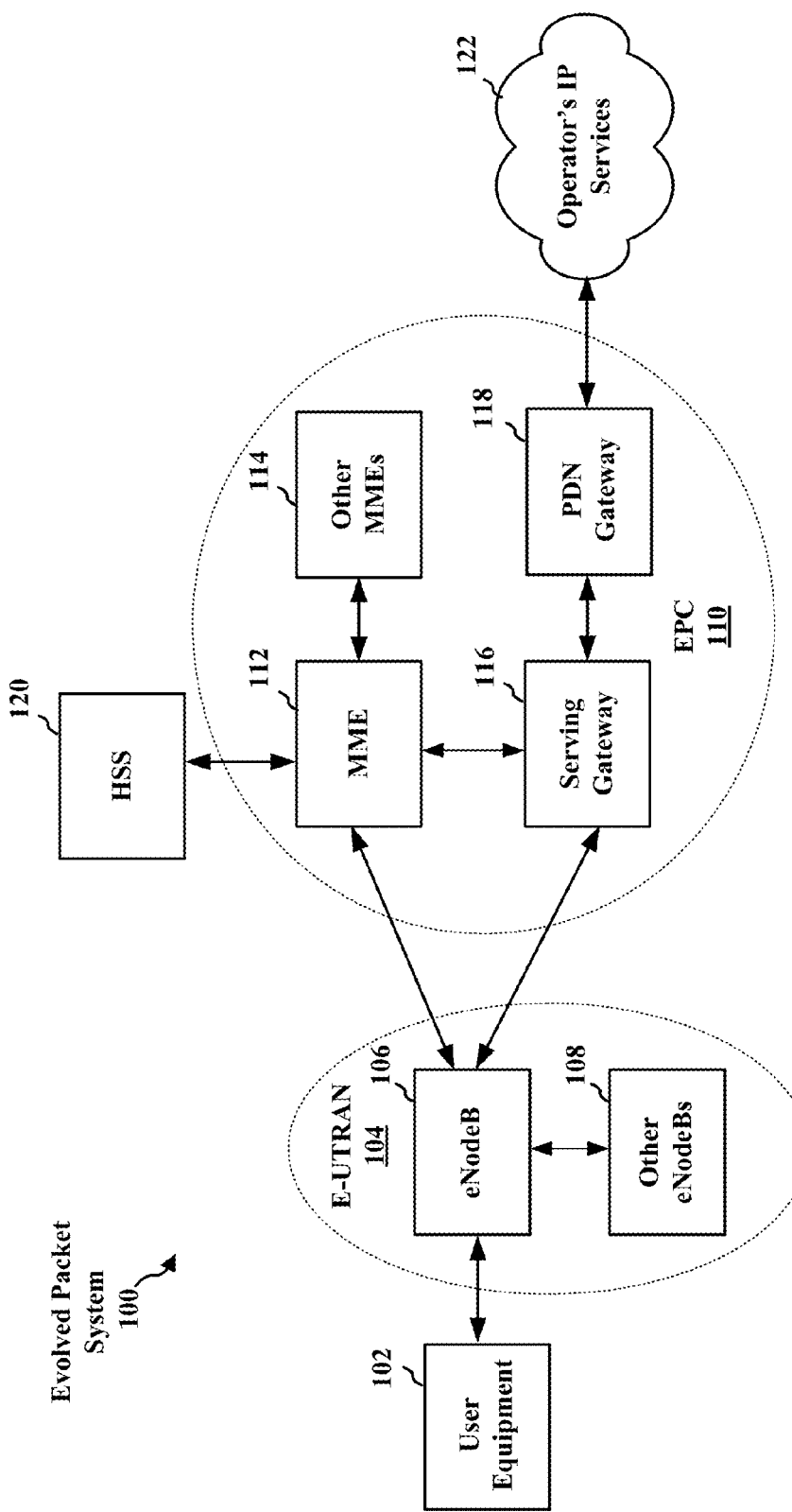
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100, which may be an LTE/LTE-Advanced (LTE/-A) network, in which base station-to-base station interference mitigation may be performed, according to one aspect of the present disclosure. LTE and LTE-Advanced are collectively referred to as "LTE". The LTE network architecture 100 may be referred to as an Evolved Packet System (EPS) 100. The LTE network architecture 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of a UE 102 include a cellular phone, a smart phone, a session initiation protocol (SIP) phone, a laptop, a netbook, a smartbook, an ultrabook, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a packet switched streaming service (PSS).

Figure 2:
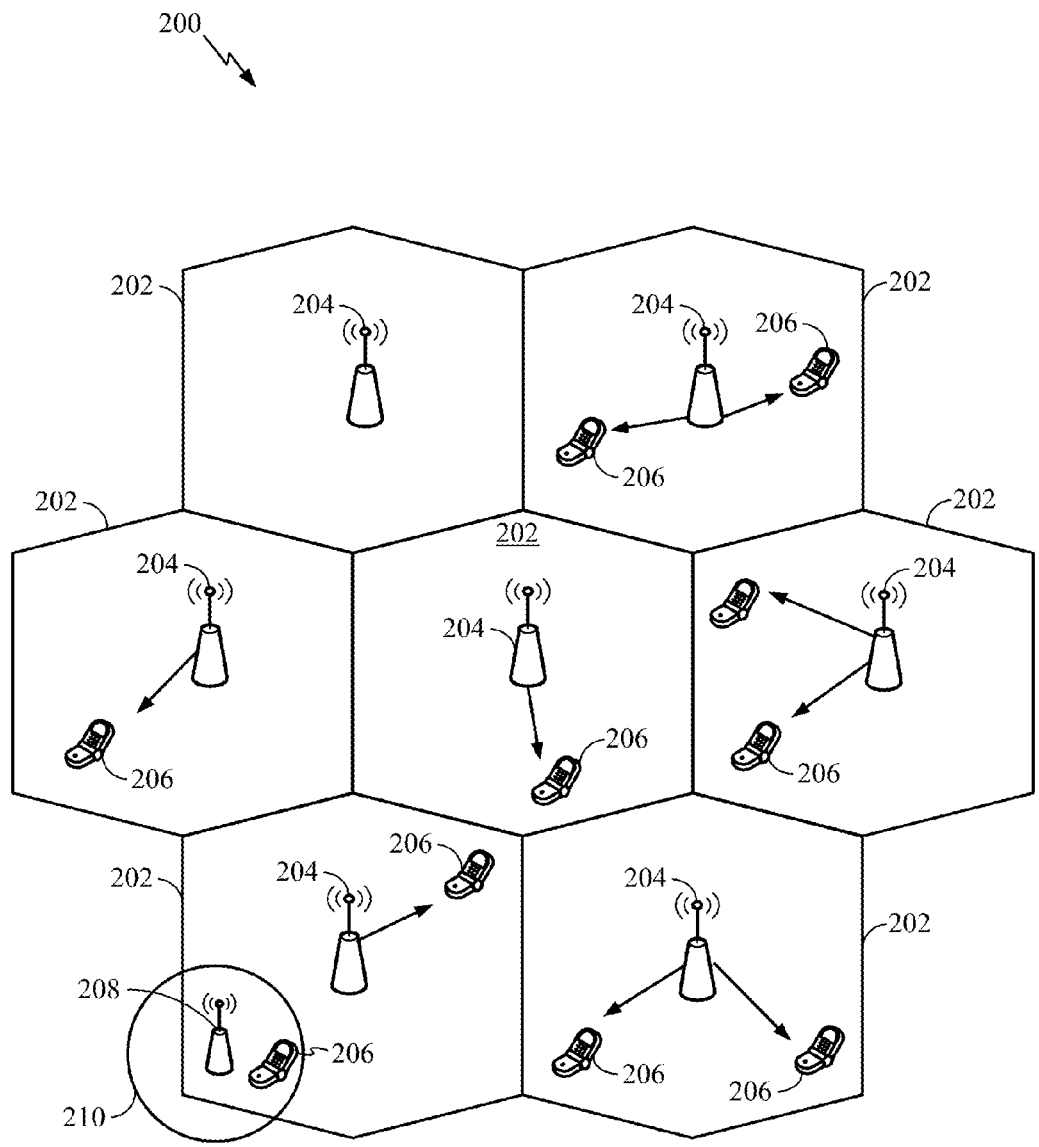
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
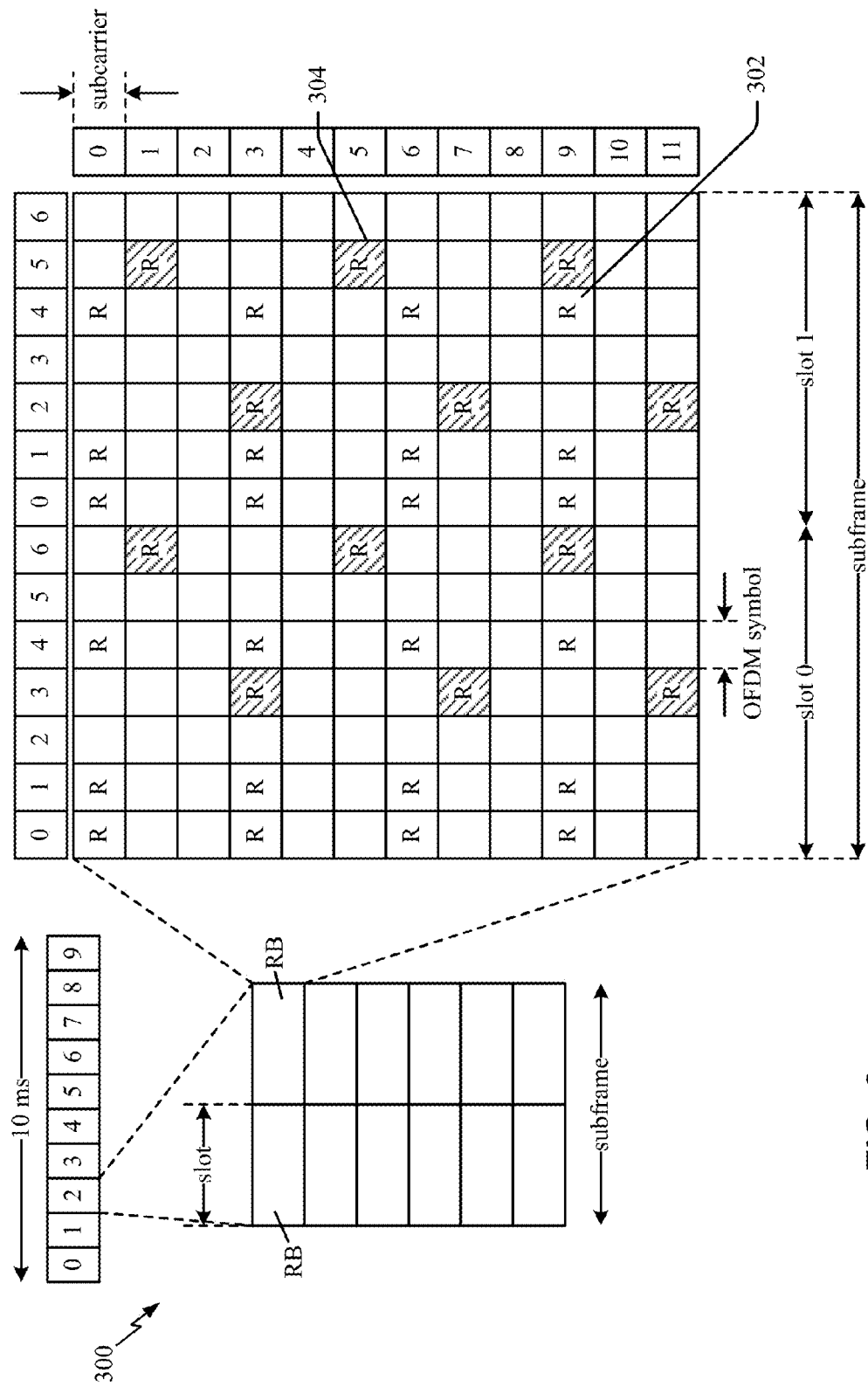
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block (RB). The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 is transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
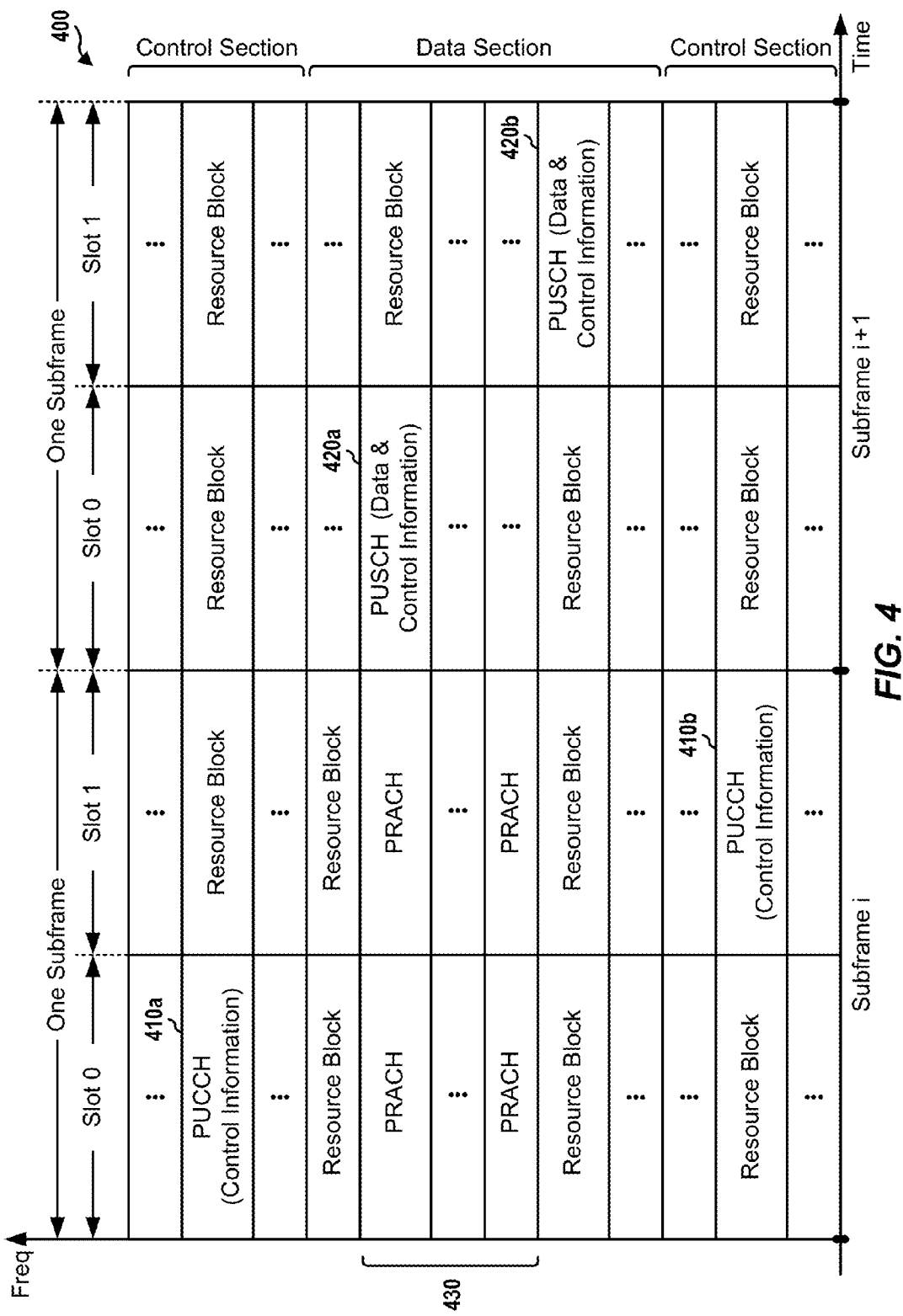
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
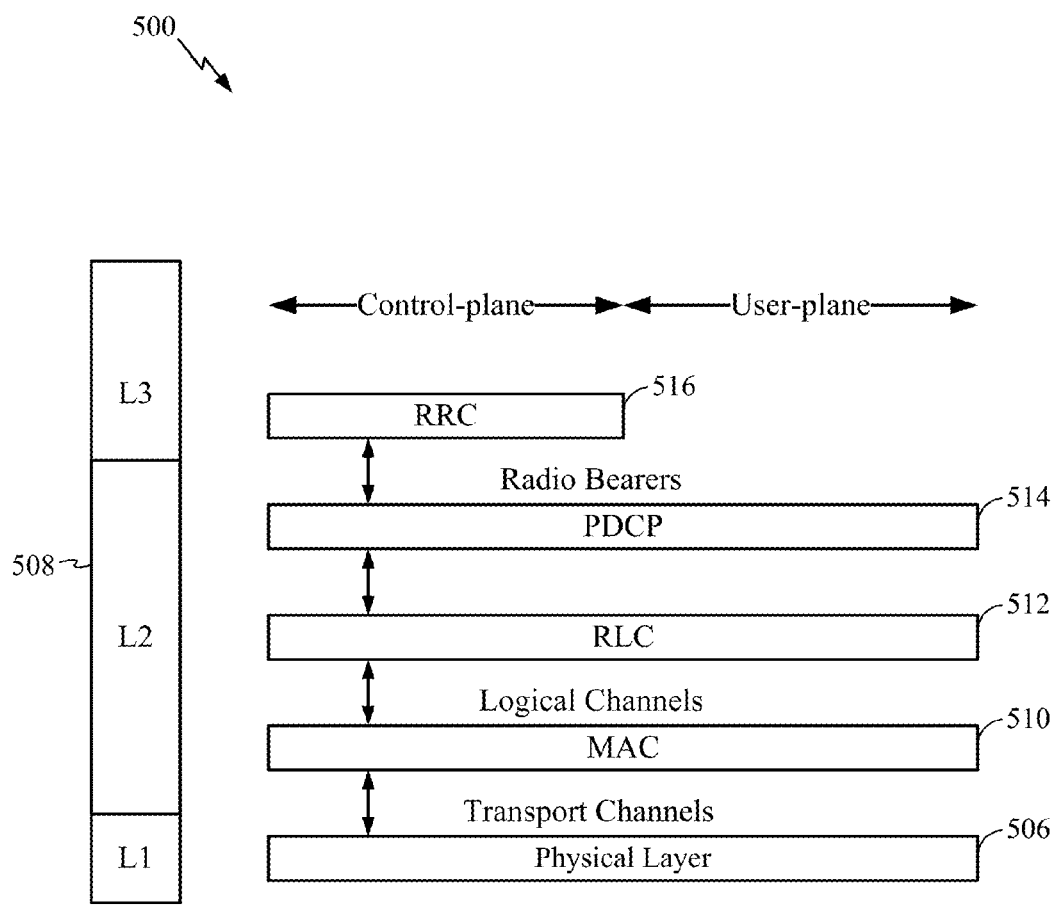
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
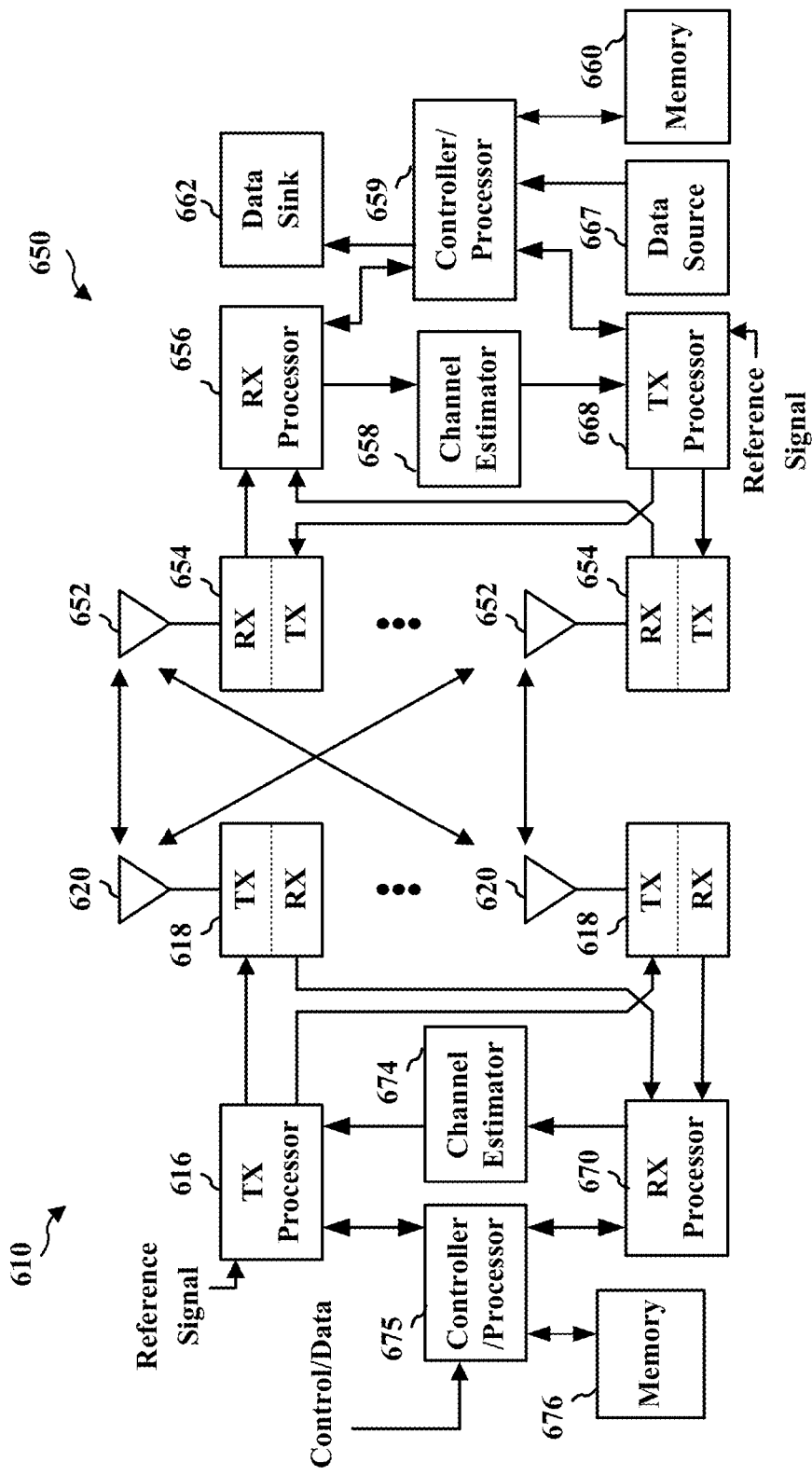
FIG. 6 is a diagram illustrating an example of an evolved Node B (eNodeB or eNB) and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618 TX. Each transmitter 618 TX modulates an RF carrier with a respective spatial stream for transmission.

At the UE 650, each receiver 654 RX receives a signal through its respective antenna 652. Each receiver 654 RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and de-interleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides de-multiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654 TX. Each transmitter 654 TX modulates an RF carrier with a respective spatial stream for transmission.

The uplink transmission is processed at the eNodeB 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations The controller/processor 675 and the controller/processor 659 may direct the operation at the eNodeB 610 and the UE 650, respectively. The controller/processor 675 and/or other processors and modules at the eNodeB 610 may perform or direct the execution of various processes for the techniques described herein. The controller/processor 659 and/or other processors and modules at the UE 650 may also perform or direct the execution of the functional blocks illustrated in use in the method flow chart of FIGS. 10-11 and/or other processes for the techniques described involving base station-to-base station interference mitigation. The memories 676 and 660 may store data and program codes for the eNodeB 610 and the UE 650, respectively.

When communications of a single radio access technology or different radio access technologies in neighboring communication spectrums are operating at the same time, potential interference between devices may occur. For example, if one communication device is attempting to receive communications at the same time as when another device is transmitting, and both devices are using the same or proximate portions of a communication spectrum, the receiving device may experience interference. Another example of interference/collision is when UEs get assigned the same resources (e.g., time/frequency/code).

Figure 7:
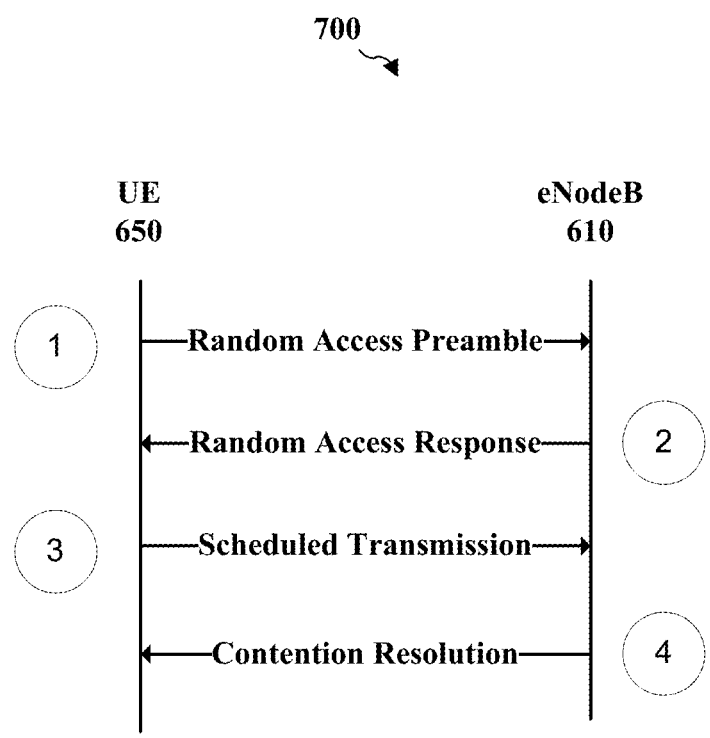
FIG. 7 is a call flow diagram illustrating a physical random access channel process according to an aspect of the present disclosure.

FIG. 7 illustrates a physical random access channel (PRACH) process 700 according to an aspect of the present disclosure that may lead to interference. At time 1, a random access preamble signature is randomly chosen by the UE (User Equipment) 650. The UE transmits the random access preamble on time/frequency resources that are pre-designated as PRACH resources by the eNodeB (evolved Node B) 610. At time 2, a random access response is sent by the eNodeB 610 on a PDSCH (Physical Downlink Shared Channel), and addressed with an ID (RA-RNTI (Random Access Radio Network Temporary Identifier)). The random access response identifies the time-frequency slot in which the preamble is detected. Unfortunately, if multiple UEs 650 collide (i.e., interfere) by selecting the same signature in the same time/frequency resource, each UE 650 receives the RAR (Random Access Response).

As further illustrated in FIG. 7, at time 3, the UE 650 transmits the first scheduled uplink transmission on a PUSCH (Physical Uplink Shared Channel) in response to the RAR (Random Access Response). The subframe on which the UE 650 sends the first scheduled uplink transmission is determined according to the subframe on which the RAR is received by the UE 650. At time 4, if multiple UEs 650 collide and the eNodeB 610 cannot decode their scheduled transmissions, then the UEs 650 restart the PRACH process after reaching the maximum number of HARQ (Hybrid Automatic Repeat reQuest) transmissions. If one of the colliding scheduled transmissions is decoded while the other is not, then the eNodeB 610 transmits a contention resolution message addressed to a C-RNTI (Cell Radio Network Temporary Identifier) indicated in the scheduled transmission (or a temporary C-RNTI). HARQ feedback is transmitted only by the UE 650 that detects its own UE identity (or C-RNTI). The other UEs 650 remain silent and exit the random access procedure.

In long term evolution (LTE)-time division duplex (LTE-TDD), the same communication spectrum is used for both uplink transmissions from the UEs 650 to the eNodeB 610 and for downlink transmissions from an eNodeB 610 to the UEs 650. The uplink and downlink transmissions are orthogonalized in time; however, to coordinate when the UEs 650 receive and when they transmit. The different TDD configurations supported in LTE are shown in Table 1 below.

TABLE 1

| UL-DL Config | DL-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In LTE-TDD, there are seven possible TDD configurations that identify whether a particular subframe is uplink (UL), downlink (DL) or a special (S) subframe for each uplink (UL) downlink (DL) configuration, as shown in Table 1. In RAN1/RAN4 (Radio Access Network Layer 1/Radio Access Network Layer 4), there is an active Release 11 study item on "Further Enhancements to LTE TDD for DL-UL Interference Management and Traffic Adaptation" (eIMTA). The TDD eIMTA proposal specifies an adaptive change to the LTE-TDD configuration based on current traffic conditions. The time scale for reconfiguration could be as small as 10 milliseconds (ms). It should be noted that while any non-legacy UEs 650 and the eNodeB 610 may adaptively change their LTE-TDD configuration in accordance with the proposal, any legacy UEs 650 remain in the original LTE-TDD configuration. In some cases, this results in a legacy UE 650 transmitting on a subframe that is actually a downlink subframe for the eNodeB 610, which may lead to interference.

Figure 8:
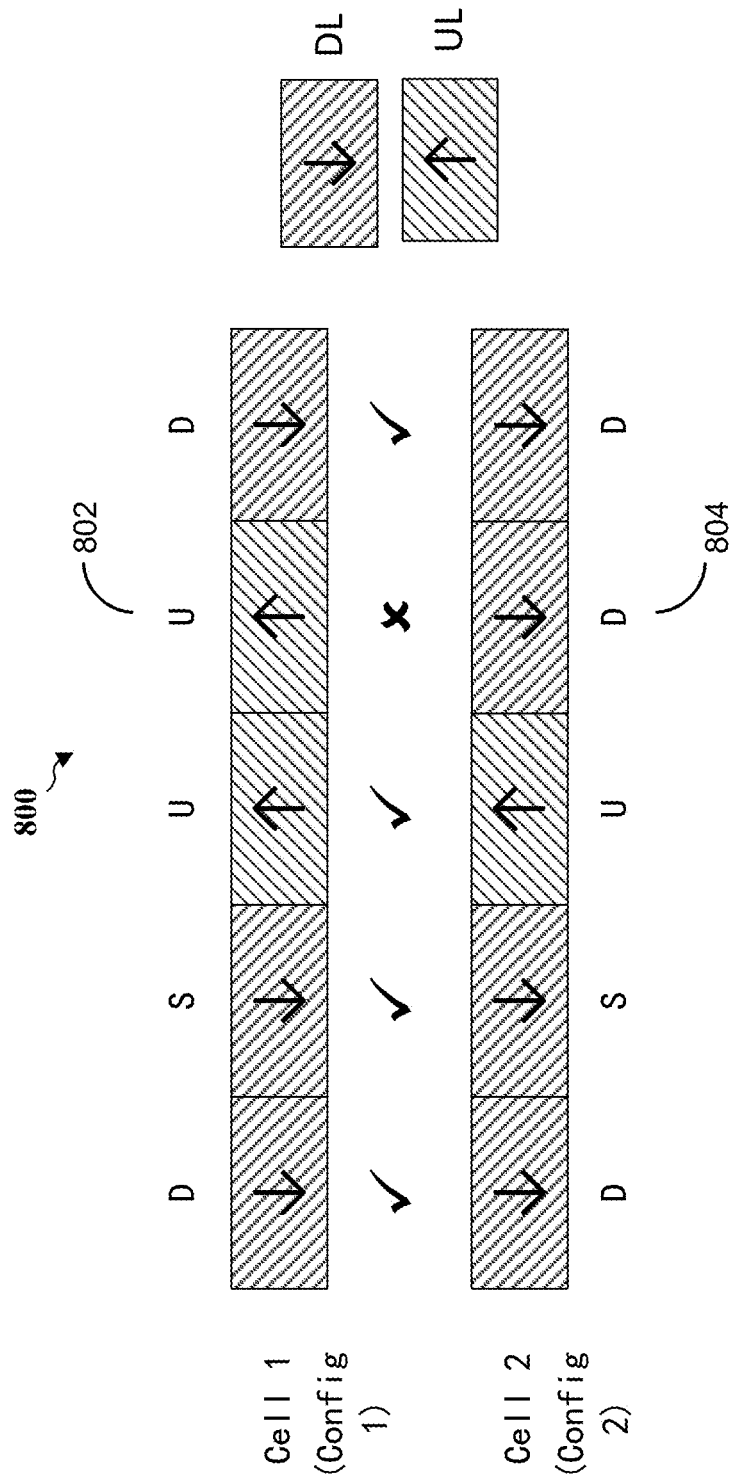
FIG. 8 is a block diagram illustrating base station-to-base station interference according to an aspect of the present disclosure.

FIG. 8 is a block diagram 800 illustrating base station-to-base station interference according to an aspect of the present disclosure. The following example demonstrates a potential interference issue when two adjacent cells deploy different LTE-TDD configurations. For example, a first cell (1) deploys a first configuration, and an adjacent, second cell (2) deploys a second configuration. In this example, an uplink subframe 802 of the first cell 1 does not match a downlink subframe 804 of the second cell 2. As a result, the possibility of base station-to-base station interference arises when an uplink subframe 802 of the first cell 1 collides with the downlink subframe 804 of the second cell 2.

Figure 9:
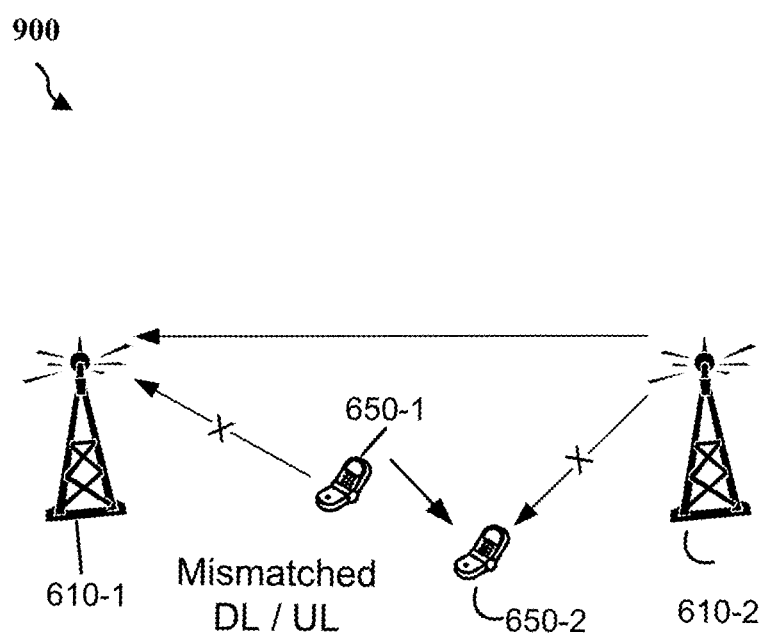
FIG. 9 is a block diagram illustrating base station-to-base station interference according to an aspect of the present disclosure.

FIG. 9 is a block diagram 900 illustrating base station-to-base station interference according to an aspect of the present disclosure. In this particular example, the eNodeB operating according to configuration 1 sees eNodeB to eNodeB interference due to the collision between the uplink subframe 802 and the downlink subframe 804, as shown in FIG. 8. As shown in FIG. 9, the mismatched uplink and downlink subframes between UEs 650-1 and 650-2 cause eNodeB to eNodeB interference between eNodeB 610-1 and eNodeB 610-2.

One aspect of the present disclosure provides base station-to-base station interference mitigation techniques. In this aspect of the disclosure, it is determined when uplink communications of a first user equipment (UE) experience interference from downlink communications of a base station. In one configuration, uplink communications of the first UE are scheduled based on the interference. For example, uplink control information may only be scheduled on subframes that do not experience interference from downlink communications of the base station. This can occur when the UE or the eNodeB is aware that it is seeing interference. The control information may include, but is not limited to, a rank indicator (RI), a channel quality indicator (CQI), a sounding reference signal (SRS), a scheduling request (SR), a physical random access channel (PRACH) message, or other link control information. The subframes with reduced likelihood of being received as uplink communications can include subframes that switch from uplink to downlink without the UE first being aware of the switch, for example when the eNodeB switches TDD configurations.

One aspect of the disclosure resolves base station-to-base station interference where certain uplink subframes see persistent interference from neighboring base stations (e.g., that renders those subframes unusable). In this example, improvements are provided for addressing downlink subframes for which it is known a priori that the corresponding ACK/NACK (Acknowledgement/Negative Acknowledgement) from the UE will be lost. In one aspect, a reduced size retransmission is employed to increase the likelihood of receiving the acknowledgement information. In another aspect, a later termination is targeted for downlink subframes for which it is known a priori that the corresponding ACK/NACK from the UE will be lost.

In another aspect, a random access channel (RACH) process is reconfigured to account for lost uplink subframes due to eNodeB to eNodeB interference. As noted, a random access preamble transmitted on uplink subframes that see eNodeB to eNodeB interference will be lost. The LTE specification, however, provides several physical random access channel (PRACH) configurations. In this example, a PRACH configuration is selected such that all PRACH resources are on uplink subframes that do not see any interference. This selected PRACH configuration should reduce or even minimize any delay in the RACH process, as shown in FIG. 7.

In another example, scheduling restrictions are placed on the random access response to ensure that the scheduled transmission from the UE is sent on an uplink subframe that does not see eNodeB to eNodeB interference. For example, if the random access response is received on the nth subframe, the UE uses the first uplink subframe at time n+k (k>=6) when the uplink delay field is set to zero (0). Otherwise, the random access response is postponed until the next available uplink subframe when uplink delay field is set to one (1). Hence by selecting the subframe on which the random access response is transmitted and by controlling the uplink delay field, the eNodeB can control which uplink subframe gets used by the UE for the scheduled transmission.

In some cases, an uplink delay field that is set to zero may lead to the use of an uplink subframe with eNodeB to eNodeB interference, while an uplink delay field being set to one may lead to usage of the uplink subframe without eNodeB to eNodeB interference. Similarly, for a given choice of the uplink delay field, the uplink subframe that is used may or may not see eNodeB to eNodeB interference depending on the downlink subframe on which the random access response is sent. In another example, a restriction is imposed on scheduling the contention resolution, such that the ACK response from the UE is on an uplink subframe that sees no interference.

A very similar RACH issue also occurs in the case of TDD eIMTA, where UEs should be prevented from transmitting PRACH messages on uplink subframes under their LTE-TDD configuration, but could potentially be downlink subframes under the LTE-TDD configurations to which the eNodeB might switch. Legacy UEs are unaware of the set of LTE-TDD configurations that the eNodeB might switch among. In this example, it is assumed that new (e.g., non-legacy) UEs are aware of this set of LTE-TDD configurations among which the eNodeB switches. For example, the set of LTE-TDD configurations may be communicated to the new UEs through separate signaling.

For legacy UEs, one aspect of the present disclosure specifies that the eNodeB selects a PRACH configuration such that all PRACH resources are on subframes that are uplink for the entire set of configurations among which the eNodeB switches. It is noted that this configuration may be more stringent than the corresponding configuration for mitigating eNodeB to eNodeB interference discussed previously. In this configuration, all PRACH resources are restricted to a particular set of uplink subframes, whereas in the eNodeB to eNodeB interference case, it is only ensured that at least one PRACH resource belongs to a particular set of uplink subframes that do not see eNodeB to eNodeB interference.

For non-legacy UEs, another aspect of the present disclosure specifies new PRACH configurations such that all PRACH resources are on subframes that are uplink for the entire set (or a subset) of configurations that the eNodeB switches between. One among these new configurations is signaled to the UE (allows potential allocation of more PRACH resources than when restricted to existing PRACH configurations). For non-legacy UEs, another aspect specifies a modification to UE operation such that among the PRACH resources available under a particular PRACH configuration, the UE only uses those that fall on subframes that are uplink for all TDD configurations (or a subset of all TDD configurations) among which the eNodeB switches or are uplink subframes in the configuration being used by the eNodeB at that time.

One aspect of the disclosure ensures that the scheduled transmission (in response to the random access response) and the ACK for contention resolution are also sent on uplink subframes. For legacy UEs, one aspect specifies scheduling the random access response and contention resolution message on downlink subframes, such that the corresponding scheduled transmission and ACK for contention resolution are transmitted on subframes that are uplink for the entire set of TDD configurations (or a subset of TDD configurations) that the eNodeB might switch among. For new UEs, one configuration specifies new timelines for the scheduled transmission and ACK corresponding to contention resolution, such that they are transmitted on subframes that are uplink for all LTE-TDD configurations (or a subset of all TDD configurations) among which the eNodeB switches.

Figure 10:
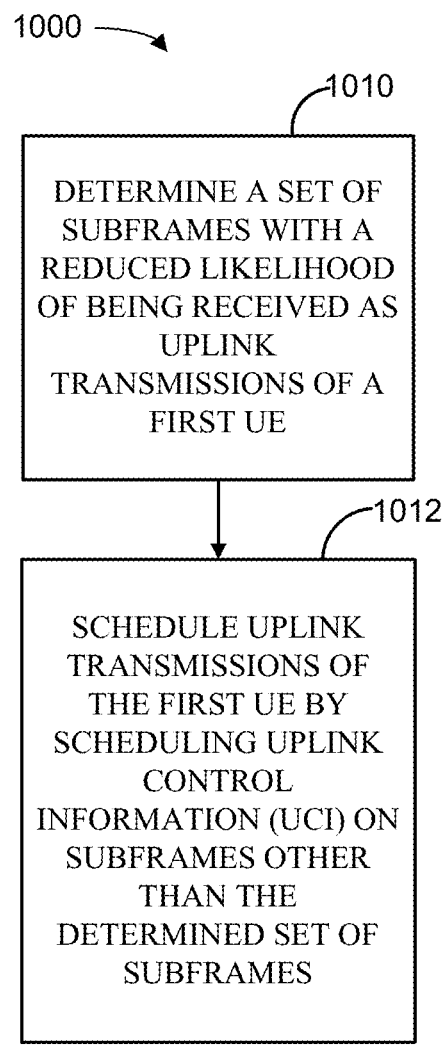
FIG. 10 is a flow diagram illustrating a method for mitigating base station-to-base station interference according to an aspect of the present disclosure.

FIG. 10 illustrates a method 1000 for mitigating base station-to-base station interference according to an aspect of the present disclosure. At block 1010, a set of subframes with a reduced likelihood of being received as uplink transmissions of a first user equipment (UE) are determined. For example, two adjacent cells deploying different time division duplex (TDD) configurations may have common subframes with an uplink (UL) and downlink (DL) mismatch resulting from the specified TDD configuration, for example, as shown in Table 1. Alternatively, the uplink transmissions of the first UE may experience interference from downlink transmissions of a base station. In block 1012, uplink transmissions of the first UE are scheduled by scheduling uplink control information (UCI) on subframes other than the determined set of subframes. The uplink communications of the first UE may be scheduled based on the interference. For example, uplink control information may only be scheduled on subframes that do not experience interference from downlink communications of the base station. The uplink control information may include, but is not limited to, a rank indicator (RI), a channel quality indicator (CQI), a sounding reference signal (SRS), a scheduling request (SR), a physical random access channel (PRACH) message, or other link control information.

In another aspect, a physical random access channel (PRACH) configuration is selected such that at least some PRACH resources are on uplink subframes that do not see interference from the base station. In this aspect, a random access response and a contention resolution message of a PRACH process are scheduled on downlink subframes such that the corresponding scheduled transmission and acknowledgement (ACK) of the contention resolution are transmitted on uplink subframes that do not see interference from the base station.

UEs with different TDD configurations can coexist in a cell, and should be multiplexed carefully to avoid interfering with each other. eNodeB implementations are generally designed to address uplink channel collisions between UEs using the same configuration. One aspect of the present disclosure overcomes collisions across UEs using different TDD configurations. For example, uplink ACK collisions may occur when the ACK/NACKs corresponding to a physical downlink shared channel (PDSCH) on different downlink subframes are sent on the same uplink subframe and potentially the same resource. In one aspect, this scenario is avoided by orthogonalizing resources (e.g., using TDM (Time Division Multiplexing) and/or FDM (Frequency Division Multiplexing)) used by legacy and new UEs for a physical uplink control channel (PUCCH) using UE specific parameters. For example, uplink ACKs for the new and legacy UEs could be sent on a different set of resource blocks by using different PUCCH offsets. An alternative aspect defines a new mapping for the PUCCH for the new UEs. For example, an ACK can be based on a subframe and location within the PDCCH. In one example, the ACK is based on the subframe number (n)+5. In another example, which resource block (RB) to use is based on the location within the subframe.

Another aspect of the present disclosure overcomes downlink ACK collisions. For example, a downlink ACK collision may occur when ACK/NACKs corresponding to different uplink subframes are sent on the same downlink subframe and potentially the same resource. In one aspect, a DM-RS (Demodulation Reference Signal) sequence assignment as well as a resource block assignment are carefully planned at the eNodeB scheduler to prevent ACK collisions. That is, scheduling avoids collisions. This aspect does not involve a change to the LTE specification. An alternate aspect specifies a new mapping for PHICH (physical HARQ indicator channel) for new UEs. In one example, the new mapping is similar to the parameter $I_{PHICH}$ in the current version of the standard, where $I_{PHICH}$ can take a greater numbers of values than allowed in the current LTE specification. For example, more PHICH resources can be configured for use in the system and an existing $I_{PHICH}$ mechanism can address additional PHICH resources. Alternatively, $I_{PHICH}$ can take a non-zero value for TDD configurations other than configuration 0, can take a non-zero value on subframes other than subframes 4 and 9 in TDD configuration 0, and can take a value greater than or equal to 2 corresponding to subframes 4 and 9 in TDD configuration 0. For example, $I_{PHICH}$ can be 1 for configurations other than 0, 1 corresponding to subframes 0, 1, 2, 3, 5, 6, 7, and 8 in configuration 0, and 2 corresponding to subframes 4 and 9 in configuration 0.

Yet another aspect of the present disclosure overcomes uplink data collisions. For example, a first transmission scheduled by an uplink grant (PDCCH (Physical Downlink Control Channel)) or retransmissions triggered by NACK (PHICH (Physical HARQ Indicator Channel)) of a UE using a first configuration could collide with a first transmission/ retransmission of a UE using a different configuration. In one aspect, uplink grants are specified to avoid a PUSCH first transmission of a UE using a first configuration with a first PUSCH transmission of a UE using a second configuration. For example, when grants sent on a same downlink subframe cause a PUSCH collision on a particular uplink subframe, then the same constraints as in LTE Release 8 operations may apply. Where grants sent on different downlink subframes for the different UEs cause a PUSCH collision on a particular uplink subframe, one aspect specifies scheduling decisions for all UEs before the first downlink subframe containing the uplink grant.

Another aspect of the present disclosure avoids PUSCH retransmission of one UE from colliding with a PUSCH retransmission of second UE (using a different TDD configuration) by specifying an ACK and SUSPEND command for at least one UE. That is, an ACK is sent so that data is not retransmitted. Later, an uplink grant is issued to cause the data to be resent. For example, the eNodeB may prioritize not suspending the UEs whose ACK is sent first. A decision as to when a collision will occur is possible if decoding status for both UEs is available before the decision to send ACK/NACK for either UE. If it is determined that a collision will occur, the eNodeB may suspend one of the UEs. In one aspect, the UE whose transmission is suspended is based on a traffic condition (e.g., QoS (Quality of Service) level) of the two UEs. Another aspect may prioritize legacy UEs over new UEs depending on whether an advertised configuration is a true configuration or a configuration with more uplink subframes than the true configuration.

Another aspect avoids a first PUSCH transmission of a first UE from colliding with a PUSCH retransmission of second UE (e.g., using a different LTE-TDD configuration). For example, the PUSCH collision can be avoided by an acknowledgement and retransmission suspension of the second UE. Alternatively, the eNodeB may avoid scheduling the uplink grant for the first UE. Alternatively, the eNodeB may determine which UE to stop by using criteria similar to those described above. For example, the eNodeB may determine which UE to stop based on whether the downlink subframe containing the ACK is before or after the subframe containing the grant, whether the UE is a new or a legacy UE, QoS of the stream, or other like suspension criteria.

Figure 11:
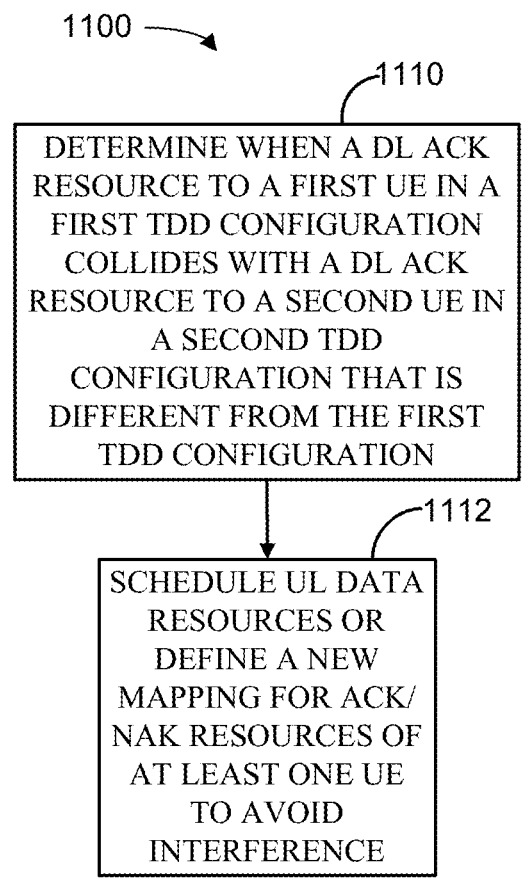
FIG. 11 is flow diagram illustrating a method for multiplexing UEs with different time division duplex (TDD) configurations according to one aspect of the present disclosure.

FIG. 11 illustrates a method 1100 for multiplexing UEs with different time division duplex (TDD) configurations according to aspects of the present disclosure. At block 1110 it is determined when a downlink acknowledgement (ACK) resource to a first UE, operating based on a first TDD configuration, could collide with a downlink ACK resource to a second UE. The second UE operates based on a second TDD configuration. In this aspect, the second TDD configuration is different from the first TDD configuration. At block 1112, uplink data resources are scheduled to avoid interference. Alternatively, a new mapping for ACK/NACK resources of at least one UE is defined to avoid the interference.

Figure 12:
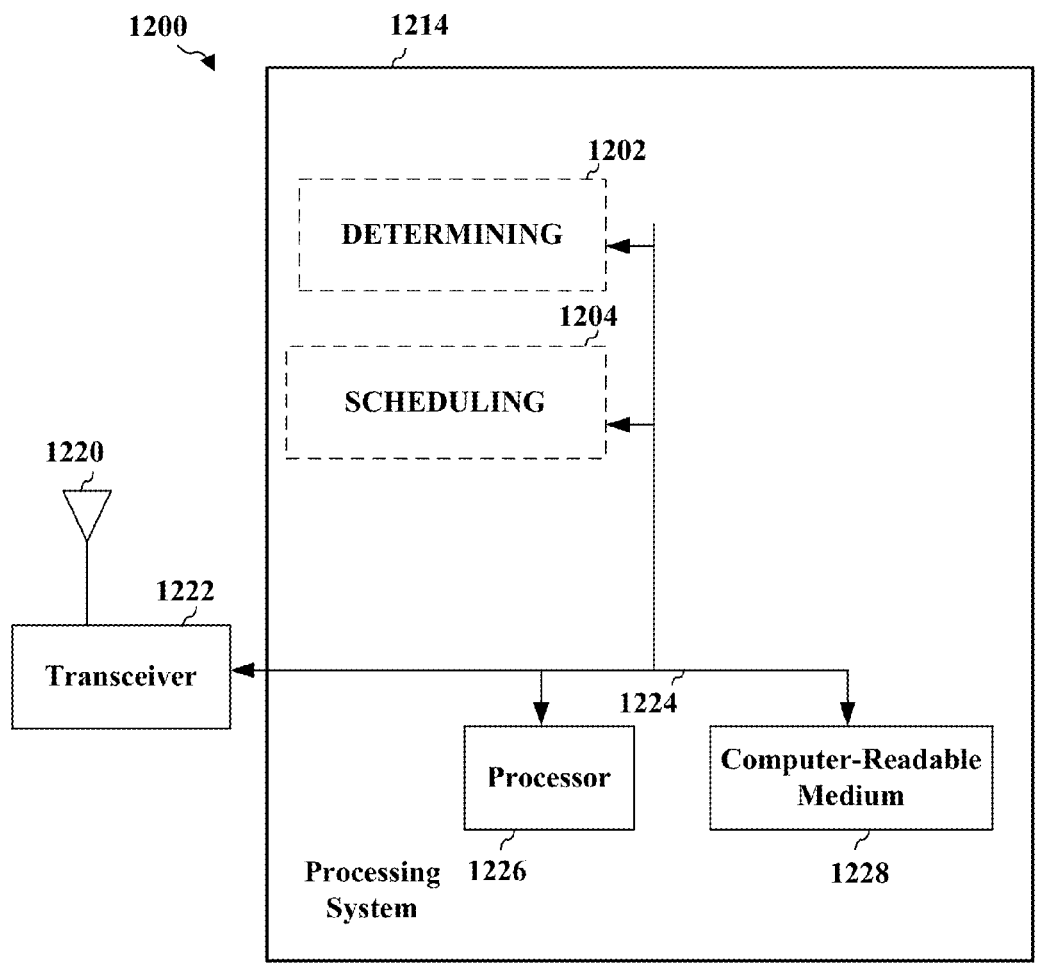
FIG. 12 is a diagram illustrating an example of a hardware implementation for an apparatus employing an base station-to-base station interference mitigation system according to one aspect of the present disclosure.

FIG. 12 is a diagram illustrating an example of a hardware implementation for an apparatus 1200 employing an base station-to-base station interference mitigation system 1214 according to one aspect of the present disclosure. The base station-to-base station interference mitigation system 1214 may be implemented with a bus architecture, represented generally by a bus 1224. The bus 1224 may include any number of interconnecting buses and bridges depending on the specific application of the base station-to-base station interference mitigation system 1214 and the overall design constraints. The bus 1224 links together various circuits including one or more processors and/or hardware modules, represented by a processor 1226, a determining module 1202, an adaptive scheduling module 1204, and a computer-readable medium 1228. The bus 1224 may also link various other circuits such as timing sources, peripherals, voltage regulators, and power management circuits, which are well known in the art, and therefore, will not be described any further.

The apparatus includes the base station-to-base station interference mitigation system 1214 coupled to a transceiver 1222. The transceiver 1222 is coupled to one or more antennas 1220. The transceiver 1222 provides a means for communicating with various other apparatus over a transmission medium. The base station-to-base station interference mitigation system 1214 includes the processor 1226 coupled to the computer-readable medium 1228. The processor 1226 is responsible for general processing, including the execution of software stored on the computer-readable medium 1228. The software, when executed by the processor 1226, causes the base station-to-base station interference mitigation system 1214 to perform the various functions described supra for any particular apparatus. The computer-readable medium 1228 may also be used for storing data that is manipulated by the processor 1226 when executing software.

The base station-to-base station interference mitigation system 1214 further includes the determining module 1202, e.g., for determining when uplink communications of a first user equipment (UE) experience interference from downlink communications of a base station. The base station-to-base station interference mitigation system 1214 further includes the adaptive scheduling module 1204, e.g., for scheduling uplink communications of the first UE based on the interference. The determining module 1202 and the adaptive scheduling module 1204 may be software modules running in the processor 1226, resident/stored in the computer-readable medium 1228, one or more hardware modules coupled to the processor 1226, or combinations thereof. The base station-to-base station interference mitigation system 1214 may be a component of the eNodeB 610 and/or the UE 650.

In one aspect, the apparatus 1200 for wireless communication includes means for determining and means for scheduling. The means may be the determining module 1202, the adaptive scheduling module 1204 and/or the base station-to-base station interference mitigation system 1214 of the apparatus 1200 configured to perform the functions recited by the determining means and the scheduling means. In one aspect of the present disclosure, the determining means may be the controller/processor 675 and/or memory 676 configured to perform the functions recited by the determining means. In this aspect of the disclosure, the scheduling means may be the controller/processor 675 and/or memory 676 configured to perform the functions recited by the scheduling means. In another aspect of the present disclosure, the determining means may be the controller/processor 659 and/or memory 660 configured to perform the functions recited by the determining means. In this aspect of the disclosure, the scheduling means may be the controller/processor 659 and/or memory 660 configured to perform the functions recited by the scheduling means. In yet another aspect, the aforementioned means may be any module or any apparatus configured to perform the functions recited by the aforementioned means.

The examples above describe aspects implemented in LTE systems. The scope of the disclosure, however, is not so limited. Various aspects may be adapted for use with other communication systems, such as those that employ any of a variety of communication protocols including, but not limited to, CDMA systems, TDMA systems, FDMA systems, and OFDMA systems.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, PCM (phase change memory) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, a priori at a first base station, when an uplink transmission of a first acknowledgement/negative acknowledgement (ACK/NACK) message from a user equipment (UE) to the first base station experiences interference from downlink communications of a second base station, the first ACK/NACK message corresponding to a first downlink data transmission and the interference resulting in a potential loss of the first ACK/NACK message; and
   transmitting a second downlink data transmission to trigger a second ACK/NACK message corresponding to the second downlink data transmission when the first ACK/NACK message is not received at the first base station, a size of the second downlink data transmission being smaller than a size of the first downlink data transmission.

2. A method of wireless communication, comprising:
   determining when uplink communications of a first user equipment (UE) operating with a first time division duplex (TDD) configuration could collide with uplink communications of a second UE operating with a second TDD configuration that is different from the first TDD configuration by determining that there is at least one subframe of the first TDD configuration colliding with a subframe of the second TDD configuration; and
   suspending, via a suspend command., a transmission or a retransmission to avoid interference between uplink data transmissions of the first UE and the second UE.

3. The method of claim 2, further comprising allocating separate uplink acknowledgement/negative acknowledgement (ACK/NACK) resources for UEs that operate with different TDD configurations to avoid interference.

4. The method of claim 3, further comprising assigning different physical uplink control channel (PUCCH) offset values for UEs operating with the different TDD configurations to separate ACK/NACK resources.

5. The method of claim 2, further comprising mapping uplink resources to avoid the interference, in which at least two different mappings to an ACK resource are defined corresponding to a downlink data transmission, at least one of the two different mappings avoiding interference with the second TDD configuration.

6. The method of claim 5, further comprising signaling to the first UE a mapping to use.

7. The method of claim 2, further comprising suspending an initial transmission by not sending an uplink grant.

8. The method of claim 7, further comprising prioritizing which UE is suspended based at least in part on whether the UE's ACK message or grant is first transmitted, traffic conditions experienced by the UE, whether a configuration assumed by the UE is a configuration used by a base station, and/or whether the UE is a legacy UE.

9. The method of claim 2, further comprising sending an ACK message to the first UE to suspend a retransmission corresponding to an uplink transmission that was not successfully decoded.

10. The method of claim 9, further comprising prioritizing which UE is suspended based at least in part on whether the UE's ACK message or grant is first transmitted, traffic conditions experienced by the UE, whether a configuration assumed by the UE is the configuration used by a base station, and/or whether the UE is a legacy UE.

11. A method of wireless communication, comprising:
    determining when a first downlink acknowledgement (ACK) resource to a first user equipment (UE) in accordance with a first time division duplex (TDD) configuration could interfere with a second downlink ACK resource to a second UE in accordance with a second TDD configuration that is different from the first TDD configuration, the first downlink ACK resource and the second downlink ACK resource mapped to a downlink subframe according to a first mapping; and
    defining a second mapping for ACK/NACK resources to avoid the interference of the first downlink ACK resource with the second downlink ACK resource, the second mapping having a greater number of resources than the first mapping.

12. The method of claim 11, further comprising scheduling uplink data resources comprising a demodulation reference signal (DM-RS) sequence and/or an allocated resource block (RB) to avoid the interference.

13. An apparatus configured for wireless communications, the apparatus comprising:
   a memory; and
   at least one processor coupled to the memory, the at least one processor being configured:
      to determine, a priori at a first base station, when an uplink transmission of a first acknowledgement/negative acknowledgement (ACK/NACK) message from a user equipment (UE) to the first base station experiences interference from downlink communications of a second base station, the first ACK/NACK message corresponding to a first downlink data transmission and the interference resulting in a potential loss of the first ACK/NACK message; and
      to transmit a second downlink data transmission to trigger a second ACK/NACK message corresponding to the second downlink data transmission when the first ACK/NACK message is not received at the first base station, a size of the second downlink data transmission being smaller than a size of the first downlink data transmission.

14. A non-transitory computer-readable medium having non-transitory program code recorded thereon, the program code comprising:
   program code to determine, a priori at a first base station, when a first uplink transmission of an acknowledgement/negative acknowledgement (ACK/NACK) message from a user equipment (UE) to the first base station experiences interference from downlink communications of a second base station, the first ACK/NACK message corresponding to a first downlink data transmission and the interference resulting in a potential loss of the first ACK/NACK message; and
   program code to transmit a second downlink data transmission to trigger a second ACK/NACK message corresponding to the second downlink data transmission when the first ACK/NACK message is not received at the first base station, a size of the second downlink data transmission being smaller than a size of the first downlink data transmission.

15. An apparatus for wireless communication, comprising:
   means determining, a priori at a first base station, when an uplink transmission of a first acknowledgement/negative acknowledgement (ACK/NACK) message from a user equipment (UE) to the first base station experiences interference from downlink communications of a second base station, the first ACK/NACK message corresponding to a first downlink data transmission and the interference resulting in a potential loss of the first ACK/NACK message; and
   means for transmitting a second downlink data transmission to trigger a second ACK/NACK message corresponding to the second downlink data transmission when the first ACK/NACK message is not received at the first base station, a size of the second downlink data transmission being smaller than a size of the first downlink data transmission.

16. An apparatus configured for wireless communications, the apparatus comprising:
   a memory; and
   at least one processor coupled to the memory, the at least one processor being configured:
      to determine when uplink communications of a first user equipment (UE) operating with a first time division duplex (TDD) configuration could collide with uplink communications of a second UE operating with a second TDD configuration that is different from the first TDD configuration by determining that there is at least one subframe of the first TDD configuration colliding with a subframe of the second TDD configuration; and
      to suspend, via a suspend command, a transmission or a retransmission to avoid interference between uplink data transmissions of the first UE and the second UE.

17. The apparatus of claim 16, in which the at least one processor is further configured to allocate separate uplink acknowledgement/negative acknowledgement (ACK/NACK) resources for UEs that operate with different TDD configurations to avoid interference.

18. The apparatus of claim 17, in which the at least one processor is further configured to assign different physical uplink control channel (PUCCH) offset values for UEs operating with the different TDD configurations to separate ACK/NACK resources.

19. The apparatus of claim 16, in which the at least one processor is further configured to map uplink resources to avoid the interference, in which at least two different mappings to an ACK resource are defined corresponding to a downlink data transmission, at least one of the two different mappings avoiding interference with the second TDD configuration.

20. The apparatus of claim 19, in which the at least one processor is further configured to signal to the first UE a mapping to use.

21. The apparatus of claim 16, in which the at least one processor is further configured to suspend an initial transmission by not sending an uplink grant.

22. The apparatus of claim 21, in which the at least one processor is further configured to prioritize which UE is suspended based at least in part on whether the UE's ACK message or grant is first transmitted, traffic conditions experienced by the UE, whether a configuration assumed by the UE is a configuration used by a base station, and/or whether the UE is a legacy UE.

23. The apparatus of claim 16, in which the at least one processor is further configured to send an ACK message to the first UE to suspend a retransmission corresponding to an uplink transmission that was not successfully decoded.

24. The apparatus of claim 23, in which the at least one processor is further configured to prioritize which UE is suspended based at least in part on whether the UE's ACK message or grant is first transmitted, traffic conditions experienced by the UE, whether a configuration assumed by the UE is the configuration used by a base station, and/or whether the UE is a legacy UE.

25. A non-transitory computer-readable medium having non-transitory program code recorded thereon, the program code comprising:
   program code to determine when uplink communications of a first user equipment (UR) operating with a first time division duplex (TDD) configuration could collide with uplink communications of a second UE operating with a second TDD configuration that is different from the first TDD configuration by determining that there is at least one subframe of the first TDD configuration colliding with a subframe of the second TDD configuration; and program code to suspend, via a suspend command, a transmission or a retransmission to avoid interference between uplink data transmissions of the first UE and the second UE.

26. An apparatus for wireless communication, comprising:

means for determining when uplink communications of a first user equipment (UE) operating with a first time division duplex (TDD) configuration could collide with uplink communications of a second UE operating with a second TDD configuration that is different from the first TDD configuration by determining that there is at least one subframe of the first TDD configuration colliding with a subframe of the second TDD configuration; and means for suspending, via a suspend command, a transmission or a retransmission to avoid interference between uplink data transmissions of the first UE and the second UE.

27. An apparatus configured for wireless communications, the apparatus comprising:

a memory; and at least one processor coupled to the memory, the at least one processor being configured:

to determine when a first downlink acknowledgement (ACK) resource to a first user equipment (UE) in accordance with a first time division duplex (TDD) configuration could interfere with a second downlink ACK resource to a second UE in accordance with a second TDD configuration that is different from the first TDD configuration, the first downlink ACK resource and the second downlink ACK resource mapped to a downlink subframe according to a first mapping; and to define a second mapping for ACK/NACK resources to avoid the interference of the first downlink ACK resource with the second downlink ACK resource, the second mapping having a greater number of resources than the first mapping.

28. The apparatus of claim 27, in which the at least one processor is further configured to schedule uplink data resources comprising a demodulation reference signal (DM-RS) sequence and/or an allocated resource block (RB) to avoid the interference.

29. A non-transitory computer-readable medium having non-transitory program code recorded thereon, the program code comprising:

program code to determine when a first downlink acknowledgement (ACK) resource to a first user equipment (UE) in accordance with a first time division duplex (TDD) configuration could interfere with a second downlink ACK resource to a second UE in accordance with a second TDD configuration that is different from the first TDD configuration, the first downlink ACK resource and the second downlink ACK resource mapped to a downlink subframe according to a first mapping; and program code to define a second mapping for ACK/NACK resources to avoid the interference of the first downlink ACK resource with the second downlink ACK resource, the second mapping having a greater number of resources than the first mapping.

30. An apparatus for wireless communication, comprising:

means for determining when a first downlink acknowledgement (ACK) resource to a first user equipment (UE) in accordance with a first time division duplex (TDD) configuration could interfere with a second downlink ACK resource to a second UE in accordance with a second TDD configuration that is different from the first TDD configuration, the first downlink ACK resource and the second downlink ACK resource mapped to a downlink subframe according to a first mapping; and means for defining a second mapping for ACK/NACK resources to avoid the interference of the first downlink ACK resource with the second downlink ACK resource, the second mapping having a greater number of resources than the first mapping.

* * * * *